United States Patent [19]

Tolnai

[11] 3,913,612
[45] Oct. 21, 1975

[54] ECCENTRIC SHEAR SEAL CARTRIDGE VALVE

[75] Inventor: Julius L. Tolnai, Los Angeles, Calif.

[73] Assignee: Price-Pfister Brass Mfg. Co., Pacoima, Calif.

[22] Filed: Dec. 16, 1974

[21] Appl. No.: 532,878

[52] U.S. Cl. ............ 137/454.6; 251/171; 251/172
[51] Int. Cl.² ............................................ F16K 25/00
[58] Field of Search ...... 137/454.5, 454.6; 251/171, 251/172, 175

[56] References Cited
UNITED STATES PATENTS

| | | | |
|---|---|---|---|
| 2,509,656 | 5/1950 | Tomoser | 251/172 |
| 3,038,696 | 6/1962 | Albrecht | 137/454.6 X |
| 3,533,436 | 10/1970 | Parkison | 251/172 X |
| 3,736,959 | 6/1973 | Parkison | 137/454.6 X |
| 3,831,621 | 8/1974 | Anthony | 137/454.6 X |

*Primary Examiner*—Harold W. Weakley
*Attorney, Agent, or Firm*—Flam & Flam

[57] ABSTRACT

The non-rising stem valve includes a hollow cartridge cage open at its top to receive a plug-like control member. A collar at the bottom of the cage projects eccentrically therefrom to accommodate a tubular seal member that forms both a static and dynamic seal. The valve body accommodates the cage and provides an accentric recess for the collar and seal member. The control member has a flat lower surface at which the plug passage opens for transit across the upper end of the seal member. The single seal member is inserted and removed with the cage as a unit, and is easily replaced. An internal groove in the seal member forms a lip for access of fluid under pressure to provide a supplemental sealing force.

9 Claims, 6 Drawing Figures

ECCENTRIC SHEAR SEAL CARTRIDGE VALVE

FIELD OF INVENTION

This invention relates to plumbing fixtures such as dual control fixtures for sinks and lavatories. More particularly, this invention relates to a cartridge valve having a non-rising stem. While a rising stem generates a substantial seating force by axial movement, a non-rising stem requires other means to generate adequate contact pressure.

U.S. Pat. No. 3,667,516 to Hicks illustrates a non-rising dual control valve that uses a spring behind a neoprene seat to generate contact pressure. A similar spring is found in U.S. Pat. No. 3,645,493 to Manoogian. In U.S. Pat. No. 3,511,729 to Politz, contact pressure is developed by selecting a seal material for the disc which has unusual dimensional stability so that a controlled contact pressure is obtained by observing close manufacturing tolerances. U.S. Pat. No. 3,476,149 to Dornaus shows a single control fixture that utilizes inlet pressure to urge a ceramic seat against a valve plate. U.S. Pat. No. 3,661,181 to Palmer and me discloses a single control valve with an axially movable stem that utilizes inlet pressure and a hollow sealing element to provide both a static seal about the water inlet and a dynamic or operating seal.

The primary object of the present invention is to provide a simple cartridge for a non-rising stem valve that utilizes inlet pressure to achieve both static and dynamic seals and that utilizes a very simple sealing element that is removed as a unit with the cartridge.

BRIEF DESCRIPTION OF THE DRAWINGS

A detailed description of the invention will be made with reference to the accompanying drawings wherein like numerals designate corresponding parts in the several figures. These drawings are to scale.

DETAILED DESCRIPTION OF THE PREFERRED EMBODIMENT

The following detailed description is of the best presently contemplated mode of carrying out the invention. This description is not to be taken in a limiting sense, but is made merely for purposes of illustrating the general principles of the invention since the scope of the invention is best defined by the appended claims.

Figure 1:
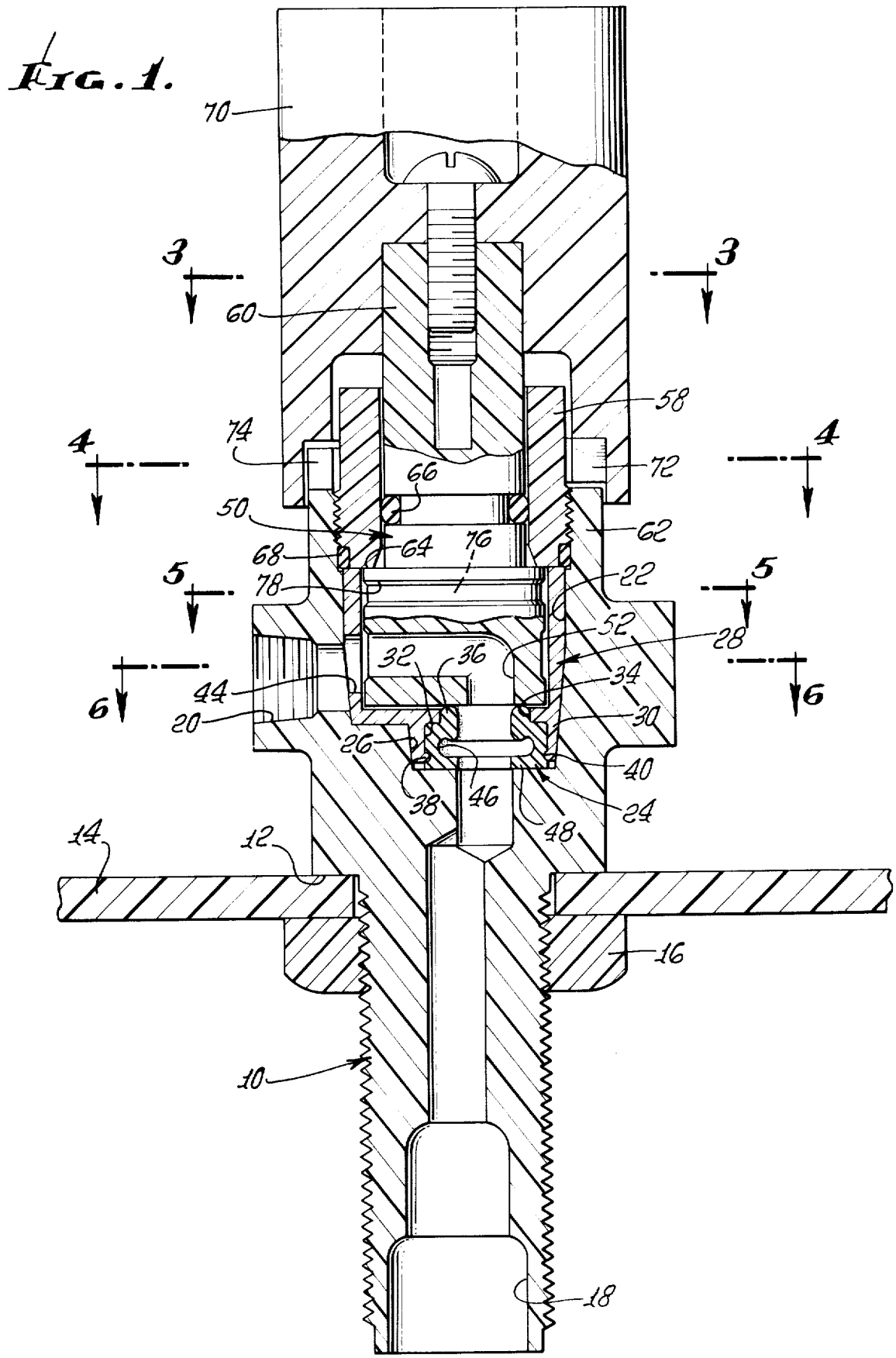
FIG. 1 is an axial sectional view of a valve structure including a valve body, a cartridge and a handle.

In FIG. 1 there is illustrated an elongated valve body 10 having a shoulder 12 intermediate its length adapted to rest about the edges of an opening in a sink or tub deck 14 whereby, with the aid of a nut 16 the body may be secured in place. An escutcheon plate for the body is not shown.

The body 10 has an inlet passage 18 that opens at the lower end of the body for connection with a suitable supply conduit (not shown).

The valve body 10 has a lateral outlet passage 20 located, in this instance, above the deck. Water entering the inlet passage 18 passes into a valve chamber 22 that also communicates with the outlet passage 20. The valve chamber 22 is formed by a deep recess opening at the top of the body.

Figure 2:
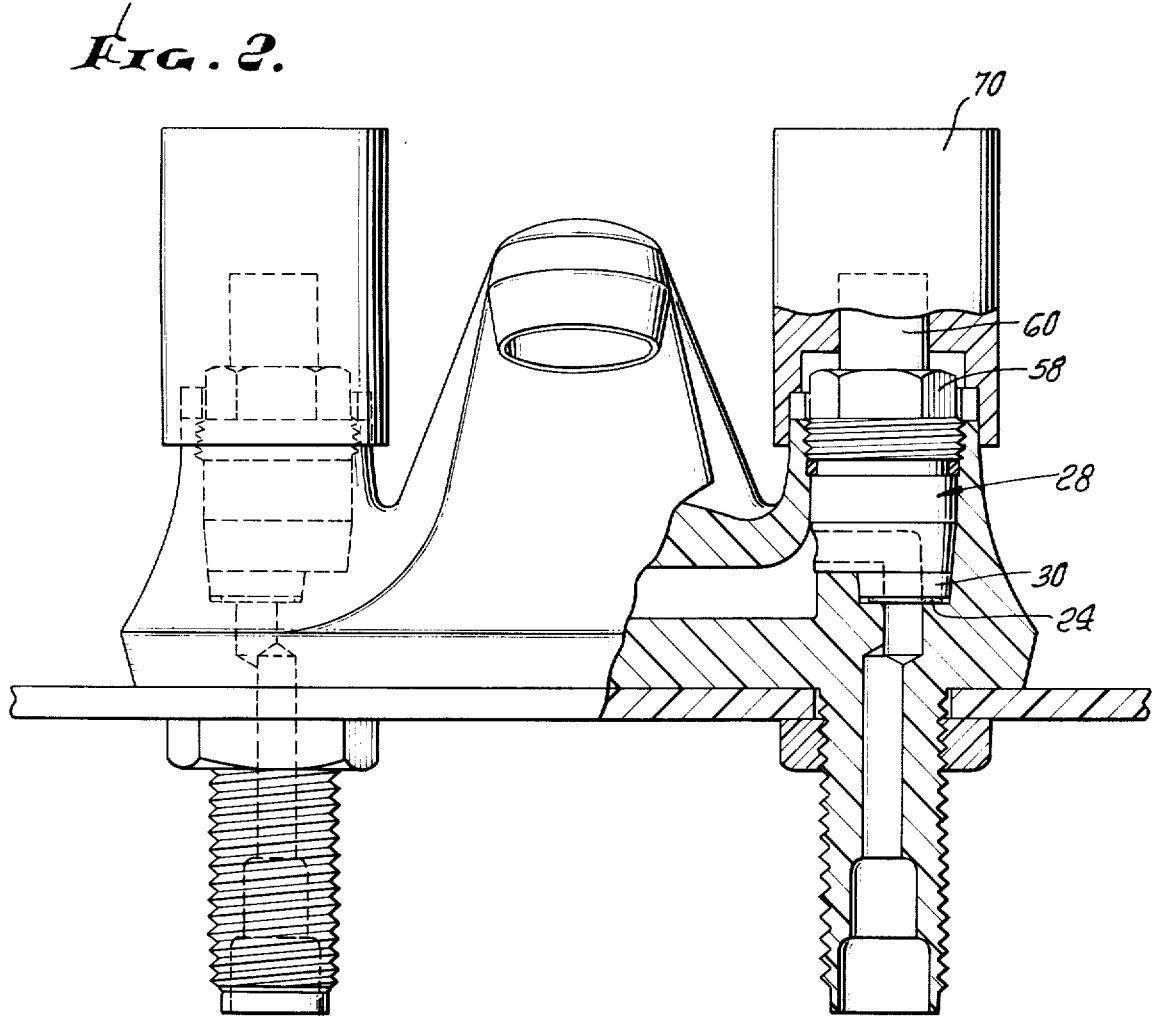
FIG. 2 is a front elevational view of a dual control deck faucet providing a body for accommodating two cartridges on opposite sides, one half of the body being shown in section.

FIG. 2 shows a dual control deck faucet body having on opposite sides, a water inlet and a lateral outlet and an intermediate valve chamber formed by a deep body recess. The two water inlets are, of course, for hot and cold water. The valve structure hereafter described for use with the valve body of FIG. 1 can also be used with the valve body of FIG. 2. In order for water to enter the chamber 22 (FIG. 1) it must pass through a generally tubular main seal 24. The seal 24 is selectively opened and closed at its top by means later to be described.

The seal 24 is located in an offset recess 26 located in the bottom of the valve chamber 22 (see also FIG. 6) and is held in place by a hollow cage 28 fitted into the valve chamber 22. The cage 28 has an eccentric collar or flange 30 that fits the eccentric recess 26. The seal 24 in turn fits the recess 32 formed by the collar. The upper end of the recess 32 terminates at the bottom wall of the cage which has a reduced opening 34. The upper end of the seal 24 is reduced to project through the opening 34 and slightly into the bottom of the cage.

The seal is releasably latched in place by an inwardly extending annular bead 38 of the collar 30 that mates with an annular groove 40 of the seal 24.

The cage has a lateral opening 44 registering with the outlet passage 20 of the body.

Figure 6:
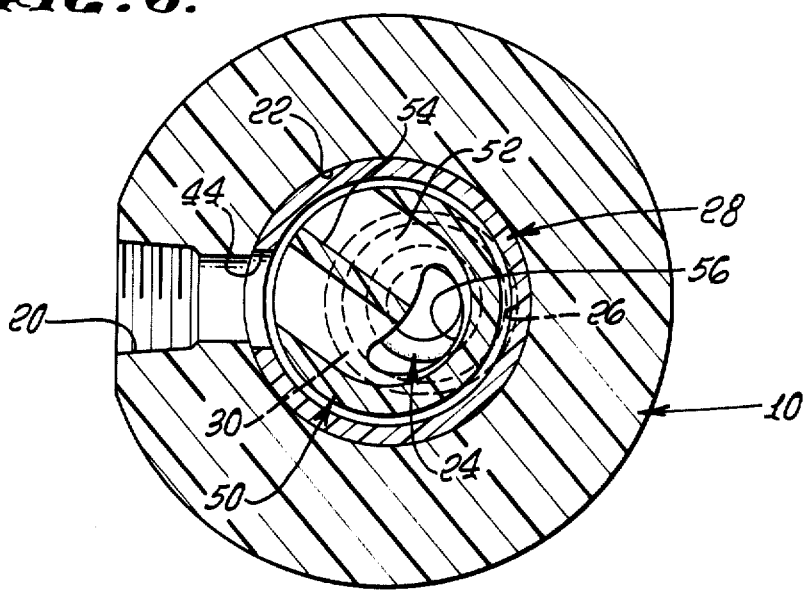

In order to clamp the seal 24 in place, use is made of the fluid pressure in the inlet passage 18. For this purpose, the inside of the seal 24 is hollowed out by an internal groove 46. This groove defines an inwardly extending lip 48 that engages the bottom of the body recess 26 about the inlet passage 18. Water under pressure entering the groove 46 causes the lip 48 to flex and firmly to engage the body. An effective static seal is thus established at one end of the seal 24. The upper end of the seal 24 provides the dynamic seal, that is, the seal selectively established by the user. For this purpose, a plug closure 50 is fitted into the cage for angular movment therein. The closure plug 50 has a flat bottom surface that forces the projection 36 to be nearly flus with the cage bottom wall. Water pressure at the internal groove 46 assists the seal to the closure bottom. To open the valve, the closure is turned until a passage 52 registers with the seal. The passage 52 is generally L-shaped. It is divided (FIG. 6) by a strengthening or reinforcing rib 52. The lower end 56 of the passage 52 is generally crescent shaped as shown in FIG. 6 and is positioned to transit the seal opening. In the position of the valve illustrated in FIGS. 1 and 6, registry is provided between the inlet 18 and the outlet 20 of the valve via the seal 24, the L-shaped passage 52 of the closure 50 and the cage opening 44. Upon movement of the closure angularly from the position shown, communication is interrupted and the flat undersurface of the closure 50 establishes a seal.

In order to hold the cage and the closure 50 in position, a hollow nut 58 is provided. The nut telescopes over a stem or operator 60 formed as an upward reduced extension of the closure 50. The nut 58 has external threads that engage internal threads formed on a body collar 62. The inner end of the nut 58 engages a shoulder 64 at the juncture of the closure and as well as the upper annular surface of the cage 28.

An O-ring seal 66 is provided between inside of the nut 58 and stem 60. Another O-ring seal 68 is provided between the nut and the body 10. The nominal dimension between the shoulder 64 and the bottom surface of the closure 50 is about 0.005 inch or 0.13 millimeters less than the height of the recess. Accordingly the nut 58 primarily clamps the cage 28 against the bottom of the body recess while merely confining the closure in the cage. The seal 24 nominally projects into the cage recess more than the 0.005 inch or 0.13 millimeters. Hence the seal is stressed when the nut confines the closure in the cage. The lower collar 30 in which the seal is accommodated terminates well short of the bottom of the eccentric recess.

Figure 3:
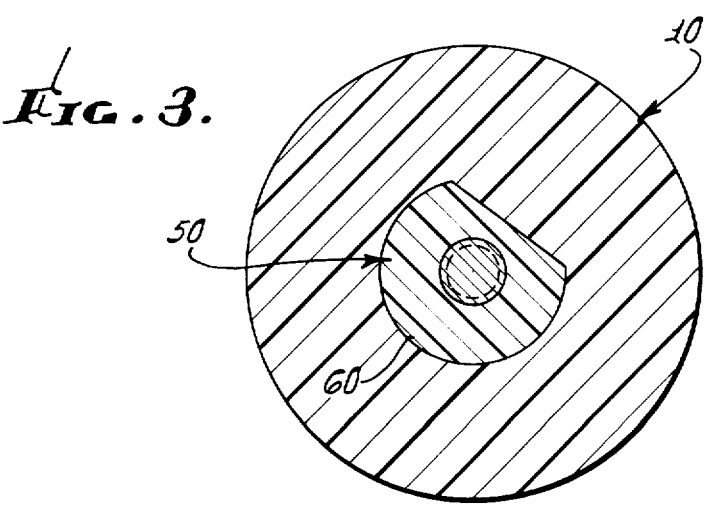
FIGS. 3, 4, 5 and 6 are transverse sectional views taken along planes corresponding to lines 3—3, 4—4, 5—5 and 6—6 of FIG. 1.
Figure 4:
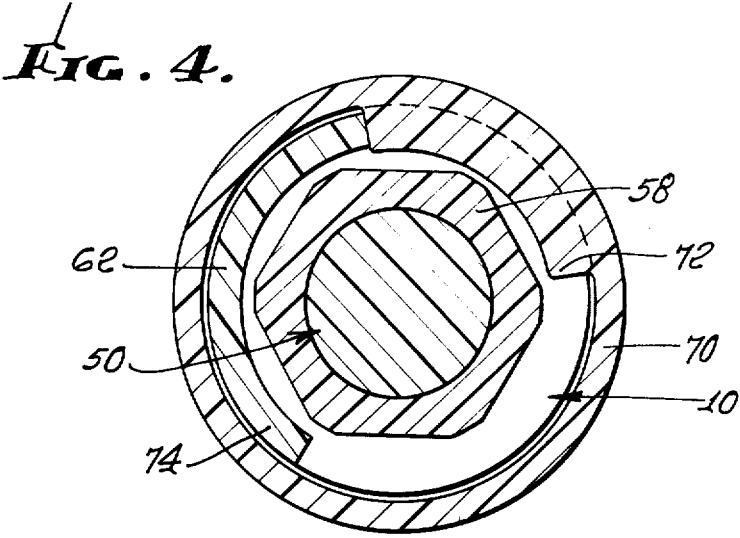

A handle 70 (FIG. 1) is fitted to the stem 60. See also FIG. 3. The handle has a skirt that overlies the body collar 62 as well as the upwardly extending part of the nut 58. The handle and the collar 62 have stops 72 and 74 (FIG. 4) that limits the movement of the closure 50 corresponding to full ON and full OFF.

Figure 5:
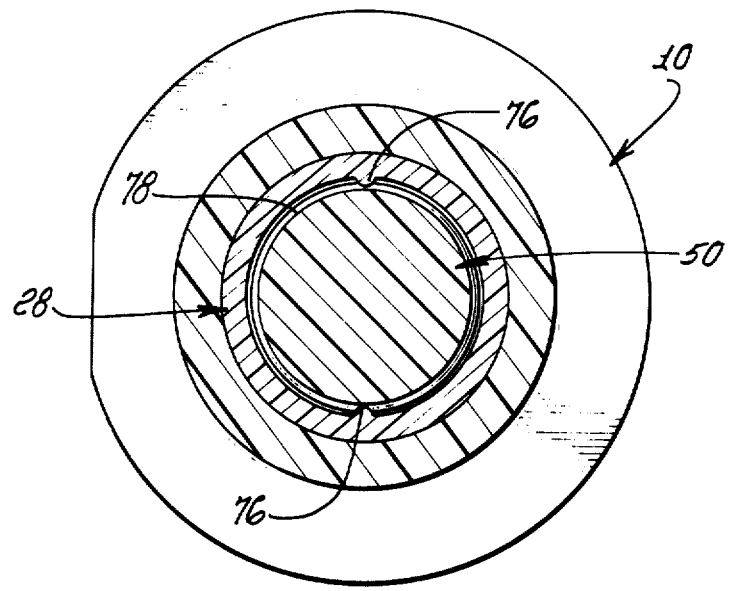

In order to remove the valve parts, the handle 70 is simply detached from the stem whereby the nut 58 is accessible for removal. When the nut 58 is removed, the stem 60 can be pulled outwardly. The closure 50 in turn pulls the cage. For this purpose, the cage has two projections 76 (FIG. 5) that snap into an annular groove 78 of the bonnet to provide an axial coupling. Just as soon as peripheral restraint is removed from the cage, the closure 50 can be snapped therefrom if desired.

With the cartridge part removed, the seal 24 is quite readily replaced by a simple manipulation. The reverse procedure reassembles the mechanism for operation. Intending to claim all new, useful and unobvious features shown or described,

I claim:

1. In combination:
   a. a hollow cartridge cage open at its top for reception of a control member;
   b. a collar projecting eccentrically downwardly from the bottom of the cage;
   c. the bottom of said cage having an opening registering with the collar;
   d. a generally tubular seal member fitted to the collar with its upper end projecting through the said bottom opening and with its lower end projecting downwardly beyond said collar;
   e. a valve body having a chamber into which said cage is fitted as well as a recess accommodating said collar and seal member; said valve body recess having an inlet registering with said lower end of said seal member and having an outlet registering with the cage;
   f. an angularly movable control member in the cage and having a lower flat surface opposed to, and in engagement with, the said upper end of said tubular seal member; said control member having a passageway opening at one end at said flat surface to transit the upper end of said seal member, and opening at the other end at a place to register with said body outlet; and
   g. clamp means urging the said cage and control member downwardly to force said lower end of said tubular seal member against the said valve body recess and the said control member flat surface into engagement with the said upper end of said tubular seal member whereby static and dynamic valve seals are both provided by said tubular seal member.

2. The combination as set forth in claim 1 together with releasable snap latch means between said collar and said seal member for unit insertion and removal.

3. The combination as set forth in claim 1 in which said seal member has an internal recess for entry of inlet fluid, said recess forming inwardly directed lips at the top and bottom for outward flexure and increased sealing under the influence of the pressure of said inlet fluid.

4. The combination as set forth in claim 1 in which said control member has an operating stem extending outwardly of said body chamber; said clamping means comprising a nut surrounding said stem and engaging both said cage and said control member at its inner end.

5. The combination as set forth in claim 1 in which said collar circumscribes said seal member.

6. In combination:
   a. a hollow cartridge cage open at its top for reception of a control member; said cage having a lateral opening;
   b. a collar projecting eccentrically downwardly from the bottom of the cage; the bottom of said cage having an opening registering with the collar; said opening being smaller than the collar to provide a flange at the base of the collar;
   c. a generally tubular seal member fitted into the collar and having an upper projection extending through said bottom cage opening; said tubular seal member having its lower end projecting downwardly beyond said collar;
   d. a valve body having a chamber into which said cage is fitted as well as a recess accommodating said collar and seal member; said valve body recess having an inlet registering with said lower end of said seal member with said seal member engaging the edges of said recess about the inlet;
   e. an angularly movable control member having a lower plug part and an upper reduced stem part, the lower plug part being guided by the cage for angular movement therein; said plug part having a lower flat surface opposed to, and in engagement with, said upper end of said tubular seal member; said plug part having a passageway opening at said flat surface to transit the upper end of said seal member, and opening at the other end at a place to register with said lateral opening of said hollow cage and body outlet; said plug part having a shoulder at the base of said stem part;
   f. a hollow nut surrounding said stem part with its inner end positioned to engage both said shoulder and the upper end of said cage, said but being in threaded engagement with the valve body at the upper end of said chamber to clamp said cage to said body and to confine said plug part against said tubular seal member whereby a static seal is achieved at one end of said seal member and a dynamic seal at the other.

7. The combination as set forth in claim 6 together with an operating handle detachably connected to said stem and circumscribing that part of the body accommodating nut.

8. The combination as set forth in claim 7 together with stop means operative between the handle and the body to determine OFF and ON positions of said plug part.

9. The combination as set forth in claim 6 in which said seal member has an internal annular recess forming a lip at the bottom of the seal member subject to the pressure of the inlet fluid to assist in the establishment of said static seal.

* * * * *